US009580659B2

(12) United States Patent
MacDonnell et al.

(10) Patent No.: US 9,580,659 B2
(45) Date of Patent: Feb. 28, 2017

(54) PROCESSES FOR LIQUEFYING CARBONACEOUS FEEDSTOCKS AND RELATED COMPOSITIONS

(71) Applicant: The Board of Regents of the University of Texas System, Austin, TX (US)

(72) Inventors: Frederick M. MacDonnell, Arlington, TX (US); Brian H. Dennis, Arlington, TX (US); Richard E. Billo, Irving, TX (US); John W. Priest, Dallas, TX (US)

(73) Assignee: The Board of Regents of the University of Texas System, Austin, TX (US)

( * ) Notice: Subject to any disclaimer, the term of this patent is extended or adjusted under 35 U.S.C. 154(b) by 0 days.

(21) Appl. No.: 14/776,423

(22) PCT Filed: Jan. 12, 2014

(86) PCT No.: PCT/US2014/011184
§ 371 (c)(1),
(2) Date: Sep. 14, 2015

(87) PCT Pub. No.: WO2014/149156
PCT Pub. Date: Sep. 25, 2014

(65) Prior Publication Data
US 2016/0040072 A1 Feb. 11, 2016

Related U.S. Application Data

(60) Provisional application No. 61/789,311, filed on Mar. 15, 2013.

(51) Int. Cl.
*C10G 1/06* (2006.01)
*C10G 1/08* (2006.01)
(Continued)

(52) U.S. Cl.
CPC .............. *C10G 1/065* (2013.01); *B01J 23/745* (2013.01); *B01J 27/043* (2013.01); *C10G 1/083* (2013.01);
(Continued)

(58) Field of Classification Search
CPC ........... C10G 1/065; C10G 1/086; C10G 3/45; C10G 1/083; C10G 3/50; C10G 2300/308; C10G 2300/301; B01J 27/043; B01J 23/745; Y02P 30/20
See application file for complete search history.

(56) References Cited

U.S. PATENT DOCUMENTS

| 4,045,328 A | 8/1977 | Green et al. | |
| 4,094,746 A * | 6/1978 | Masciantonio | ......... C10B 49/10 201/12 |
| 4,303,497 A | 12/1981 | Mitchell et al. | |
| 4,356,071 A * | 10/1982 | Fenton | ..................... C08G 2/08 528/230 |

(Continued)

FOREIGN PATENT DOCUMENTS

WO    WO-2012/092644 A1    7/2012

OTHER PUBLICATIONS

Iannibello et al (Bauxite-based catalysts in heavy crude oil hydrotreating, Applied Catalysis, vol. 3, Issue 3, 1982, pp. 261-272).*

*Primary Examiner* — Randy Boyer
*Assistant Examiner* — Juan Valencia
(74) *Attorney, Agent, or Firm* — Winstead PC (57) ABSTRACT

Methods for the conversion of lignites, subbituminous coals and other carbonaceous feedstocks into synthetic oils, including oils with properties similar to light weight sweet crude oil using a solvent derived from hydrogenating oil produced by pyrolyzing lignite are set forth herein. Such methods may be conducted, for example, under mild operating conditions with a low cost stoichiometric co-reagent and/or a disposable conversion agent.

23 Claims, 7 Drawing Sheets

(51) Int. Cl.
*C10G 3/00* (2006.01)
*B01J 23/745* (2006.01)
*B01J 27/043* (2006.01)

(52) U.S. Cl.
CPC .............. *C10G 1/086* (2013.01); *C10G 3/45* (2013.01); *C10G 3/50* (2013.01); *C10G 2300/301* (2013.01); *C10G 2300/308* (2013.01); *Y02P 30/20* (2015.11)

(56) References Cited

U.S. PATENT DOCUMENTS

| | | | | |
|---|---|---|---|---|
| 4,560,465 A | * | 12/1985 | Yu | C10G 45/04 208/251 H |
| 4,652,433 A | * | 3/1987 | Ashworth | B03B 9/04 209/10 |
| 4,879,021 A | * | 11/1989 | Hippo | C10G 1/006 208/413 |
| 5,866,501 A | * | 2/1999 | Pradhan | C10G 65/10 208/143 |
| 2001/0006984 A1 | * | 7/2001 | Lapidus | B01J 23/94 518/709 |
| 2011/0124498 A1 | * | 5/2011 | Kuperman | B01J 23/80 502/221 |
| 2011/0319304 A1 | | 12/2011 | Van Houten | |
| 2012/0080358 A1 | * | 4/2012 | Stiller | C10G 1/002 208/434 |
| 2013/0233764 A1 | * | 9/2013 | Brown | C10G 49/18 208/14 |
| 2013/0256190 A1 | * | 10/2013 | Van Wees | C10G 45/58 208/59 |

* cited by examiner

PROCESSES FOR LIQUEFYING CARBONACEOUS FEEDSTOCKS AND RELATED COMPOSITIONS

CROSS-REFERENCES TO RELATED APPLICATIONS

This Application claims the benefit under 35 U.S.C. §119(e) of U.S. Provisional Patent Application Ser. 61/789,311 filed Mar. 15, 2013, which is incorporated herein by reference in its entirety as if fully set forth herein.

STATEMENT REGARDING FEDERALLY-SPONSORED RESEARCH OR DEVELOPMENT

This invention was made with government support under Grant No. HR0011-09-C-0108 from the Defense Advanced Research Projects Agency and Grant No. DE-FG36-08GO88170 from the Department of Energy. The government has certain rights in the invention.

BACKGROUND OF THE INVENTION

The present disclosure relates generally to the field of hydrocarbon synthesis. More particularly, but not exclusively, it relates to processes for the liquefaction of carbonaceous feedstocks, including lignite and coal.

Coal liquefaction is the process of producing synthetic liquid fuels from coal and other carbonaceous feedstocks. Such processes have been generally known for nearly 90 years. See, for example, *Coliquefaction Studies of Waste Polymers and Lignite Influenced by Acidic and Oil-Soluble Catalysts* (Gimouhopoulos et al., 2000); *Influence of Heterogeneous Catalysts on the Coprocessing of Bergueda Lignite with a Vacuum Residue* (Bengoa et al., 1997); *Coprocessing of Bergueda Lignite with Vacuum Residue under Increasing Hydrogen Pressure. Comparison with Hydrotreating* (Bengoa et al., 1995); *Influence of Fe and FeMo High Loading Supported Catalysts on the Coprocessing of two Spanish Lignites with a Vacuum Residue* (Font et al., 1994); *Study of Iron-Based Complex Catalysts For Coal Liquefaction* (Sun et al, 1989); *Evaluation of the Hydroliquefaction Potential of Chinese Coals: Three Case Studies* (Gao et al., 1989); *Catalytic Conversions of Kansk-Achinsk Lignite to Synthetic Fuels and Chemicals* (Kuznetsov et al., 1988); *Hydrogenation of Lignite by Synthesis Gas* (Kuznetsov et al., 1988); *Function of Metal Oxide and Complex Oxide Catalysts for Hydrocracking of Coal* (Tanabe et al., 1986); *Catalytic Functions of Iron Catalysts for Hydrocracking of Carbon-Carbon and Carbon-Oxygen Bonds* (Hattori et al., 1985); U.S. Pat. No. 5,509,945; U.S. Pat. No. 5,200,063; U.S. Pat. No. 5,071,540; U.S. Pat. No. 5,026,475; U.S. Pat. No. 4,853,111; U.S. Pat. No. 4,842,719; U.S. Pat. No. 4,839,030; U.S. Pat. No. 4,816,141; U.S. Pat. No. 4,728,418; U.S. Pat. No. 4,459,138; U.S. Pat. No. 4,385,042; U.S. Pat. No. 4,383,094; U.S. Pat. No. 4,356,079; U.S. Pat. No. 4,334,977; U.S. Pat. No. 4,332,666; U.S. Pat. No. 4,325,801; U.S. Pat. No. 4,311,578; U.S. Pat. No. 4,303,494; U.S. Pat. No. 4,300,996; US 20080011643; US 20060032788; and US 20020179493. Processes using hydrogenated coal tar distallate as the solvent have been demonstrated. See, for example, Neavel et al. (1981) and Mitchell et al. (1979).

SUMMARY OF THE INVENTION

This disclosure includes methods for the manufacture of synthetic oil (synoil), including processes for the liquefaction of lignite, coal and other carbonaceous feedstocks. In one aspect, methods for the preparation of synoil are disclosed that comprise mixing carbonaceous feedstocks with slurry oils to generate slurries; contacting the slurries with iron-containing conversion agents to generate a slurry-agent mixtures; reacting the slurry-agent mixtures at a hydrogen pressure of from 700 psi to 1,200 psi and a temperature of from 280° C. to 450° C. to generate reaction-product mixtures, whereby some or all of the carbonaceous feedstocks are converted into synoils; and separating solids from the reaction-product mixtures to form a synoil.

This disclosure includes processes for the manufacture of a solvent from a carbonaceous feedstock, which in turn may be used for the preparation of a slurry in the liquefaction process.

This disclosure includes methods for the preparation of a solvent, comprising: pyrolyzing a carbonaceous feedstock whereby some or all of the carbonaceous feedstock is converted to a pyrolysis oil; contacting the pyrolysis oil with an iron-containing conversion agent to form a pyrolysis oil-agent mixture; and reacting the pyrolysis oil-agent mixture at a hydrogen pressure from 300 psi to 1,000 psi and a temperature from 300° C. to 400° C. to generate a solvent.

This disclosure also includes carbonaceous compositions comprising a material formed from the pyrolysis of a carbonaceous feedstock, wherein the material has a boiling range between 80° C. to 600° C. as determined using the ASTM 2887 protocol.

BRIEF DESCRIPTION OF THE DRAWINGS

The following drawings illustrate by way of example and not limitation, aspects of the present disclosure. For the sake of brevity and clarity, every feature of a given structure is not always labeled in every figure in which that structure appears. Identical reference numbers do not necessarily indicate an identical structure. Rather, the same reference number may be used to indicate a similar feature or a feature with similar functionality, as non-identical reference numbers.

DESCRIPTION OF EXEMPLARY EMBODIMENTS

The disclosure provides processes for the conversion of lignites, subbituminous coals and other carbonaceous feedstocks into synthetic oils, including oils with properties similar to light weight sweet crude oil. The disclosure further provides methods for the preparation of solvents that may be used in processes for the conversion of lignites, subbituminous coals and other carbonaceous feedstocks into synthetic oils. In certain embodiments, such processes may be carried out under mild operating conditions with a low cost stoichiometric co-reagent and/or a disposable catalyst.

DEFINITIONS

The term "carbonaceous feedstock" refers to compositions comprising lignite, subbituminous coal, low-ranked coal, and/or heavy petroleum. In certain embodiments, the carbonaceous feedstocks comprise 10% to 100% volatile carbon material, such as low rank coals. The term "volatile material" as set forth herein, refers to compounds, other than water, that are released from the feedstock when it's heated in an inert gas, like nitrogen. In certain embodiments, the volatile material comprises a mixture of short and long chain hydrocarbons and aromatic hydrocarbons.

The term "lignite" refers to a yellow to dark brown or, in some embodiments, a black coal that is an intermediate between peat and subbituminous coal according to the coal classification used in the United States and Canada. In certain embodiments, lignite comprises between 15% to 70% of moisture, an equal mix of volatile and fixed carbon, and some inorganic compounds, such as metal oxides and sulfur. Furthermore, certain forms of lignite have high levels of oxygen in its polymeric structure, up to 20% of its dry weight. As coals get higher in rank, the fixed carbon increases, volatiles decrease, and oxygen decreases.

The term "substantially" and its variations (e.g., "approximately" and "about") are defined as being largely but not necessarily wholly what is specified (and include wholly what is specified) as understood by one of ordinary skill in the art. In any disclosed embodiment, the terms "substantially," "approximately," and "about" may be substituted with "within [a percentage] of" what is specified, where the percentage includes 0.1, 1, 5, and 10 percent.

The terms "a" and "an" are defined as one or more unless this disclosure explicitly requires otherwise.

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or composition that "comprises," "has," "includes" or "contains" one or more steps or elements possesses those one or more steps or elements, but is not limited to possessing only those one or more elements. Likewise, a step of a method or an element or component of a composition that "comprises," "has," "includes" or "contains" one or more features possesses those one or more features, but is not limited to possessing only those one or more features. Additionally, terms such as "first" and "second" are used only to differentiate steps, structures, features, or the like, and not to limit the different structures or features to a particular order.

Additionally, terms such as "first" and "second" are used only to differentiate structures, features, or steps, and not necessarily to limit the different structures, features, or steps to a particular order.

The above definitions supersede any conflicting definition in any of the reference that is incorporated by reference herein. The fact that certain terms are defined, however, should not be considered as indicative that any term that is undefined is indefinite.

Liquefaction Methods for Carbonaceous Feedstock

Some embodiments of the present methods for the preparation of synthetic oil (synoil) comprise mixing carbonaceous feedstock with oils to generate slurries; contacting the slurries with iron-containing conversion agents to generate a slurry-agent mixtures; reacting the slurry-agent mixtures at a hydrogen pressure of from 700 psi to 1,200 psi and a temperature of from 280° C. to 450° C. to generate reaction-product mixtures, whereby some or all of the carbonaceous feedstocks are converted into synthetic oils (synoils); and separating solids from the reaction-product mixtures. In some embodiments, the oil comprises light to intermediate crude oils and/or hydrogenated pyrolysis oils.

Some embodiments of the methods provided herein may be used, for example, for the conversion of lignites, subbituminous coals and other carbonaceous feedstocks into synoils, including oils with properties similar to medium to light weight sweet crude oil. Such methods may be conducted, for example, under mild operating conditions with stoichiometric co-reagents and/or disposable catalysts. In some embodiments, the methods disclosed herein may serve as low cost processes for producing a synthetic crude oil feedstock from, for example, lignite or subbituminous coal supplies. Synoil may serve as an acceptable substitute or alternative to petroleum based crude oils as a feedstock for oil refineries.

In some embodiments, synoil produced from the processes disclosed herein is lower in cost than such crude-oil alternatives. Moreover, in some embodiments, it is low in sulfur. In some embodiments, the method may produce less greenhouse gases than crude oil alternatives. In some embodiments, it is equivalent to, or of higher quality than petroleum crudes. Synoil produced using the methods provided herein may also serve as substitute for crude oil for the plastics industry.

In some embodiments, the processes disclosed herein may emit less greenhouse gases and/or other pollutants than conventional crude extraction and refining, the Fischer-Tropsch process, and/or direct combustion of the coal.

Figure 1:
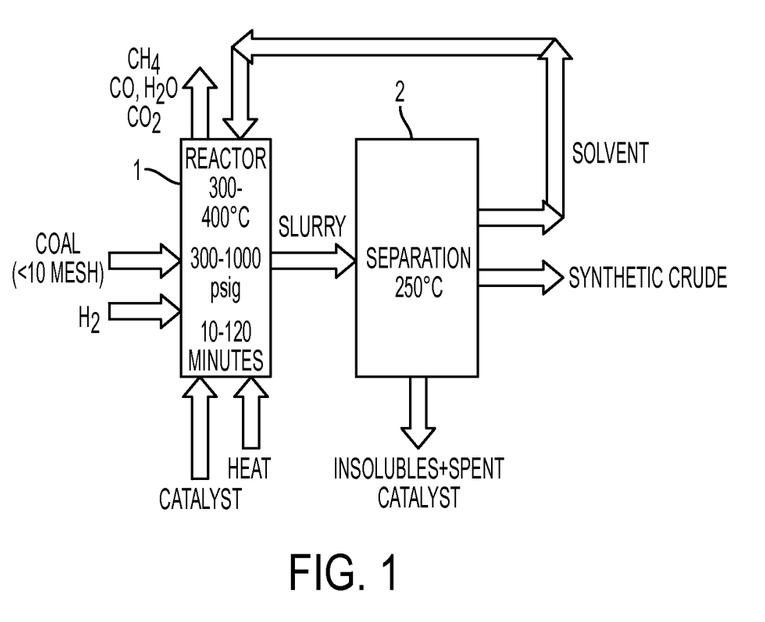
FIG. 1 depicts a schematic diagram for one of the present processes.

FIG. 1 depicts a simplified process-flow diagram illustrating general, exemplary embodiments of the apparatuses and methods of the present disclosure. This diagram is offered for illustrative purposes only, and thus it merely depicts specific embodiments and is not intended to limit the scope of the claims in any way. In the embodiment shown in FIG. 1, lignite/subbituminous coal and/or other carbonaceous feedstock is mixed in a first step (step 1 in FIG. 1) with a solvent (slurry oil) to produce a slurry. In certain embodiments, the solvent or slurry oil is light crude oil, pyrolysis oil, hydrogenated pyrolysis oil, intermediate crude oil, used motor oil, diesel, xylenes, tetralin, aliphatic hydrocarbons or aromatic hydrocarbons or mixtures thereof.

In certain embodiments, the feedstock is dried to less than 20% moisture prior to mixing with a solvent. The slurry is heated under hydrogen pressure in a suitable reactor at a temperature above 200° C. while being mixed. In some embodiments, the reactor may be a continuously stirred, or backflow mixed, batch, or continuous plug flow type. An iron containing conversion agent or catalyst may be introduced, for example, as fine particles into the slurry or as a fixed bed in the reactor. During this step, a significant portion of the coal is transformed into liquid and/or gas. The gases can be used as fuel gas to provide heat for the overall process. In other embodiments, the mixture of the carbonaceous feedstock and solvent is allowed to sit for a period of time prior to the introduction of the conversion agent.

The heated slurry is delivered to a separator in a second step, in some embodiments, where the solids are removed from the liquid carrier phase. This could be accomplished, for example, with a large scale centrifuge. Keeping the slurry temperature above 200° C. reduces the viscosity of the oil. The solid material removed in this step is expected to be mostly inorganic (minerals, metal oxides, etc.) with some small amount of fixed carbon. The liquid volume exiting this step is expected to be larger than the liquid volume entering the first step. The net difference represents the synthetic crude product or synoil, which can be processed by oil refineries.

In certain embodiments, a portion of the synoil is recycled for use in the preparation of the slurry of the carbonaceous feedstock. When the synoil is generated, a portion of it is mixed with the slurry oil or solvent that is added to the carbonaceous feedstock to form a slurry. This "recycling" of the generated synoil is illustrated in FIG. 1 where a portion of the synoil designated as "solvent" is added to the reactor containing the slurry prepared from carbonaceous feedstock.

Figure 2:
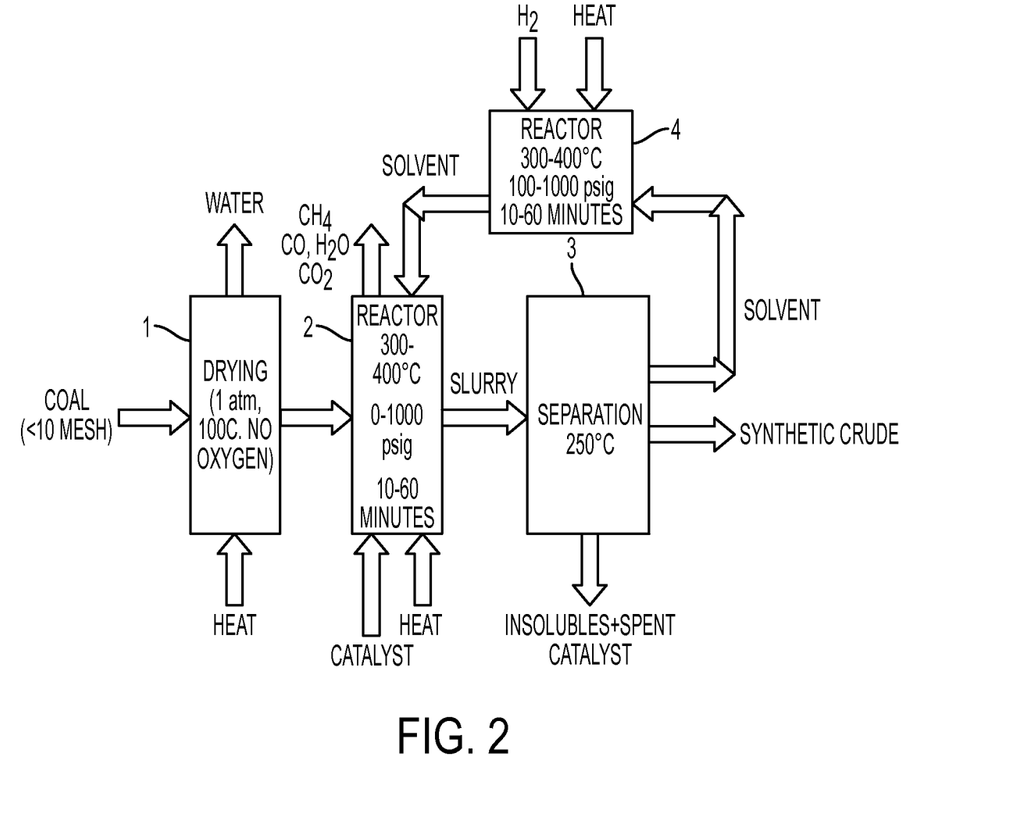
FIG. 2 depicts a schematic diagram for one of the present processes.

In other embodiments, the portion of the synoil that is recycled is hydrogenated prior to recycling. This step is illustrated in FIG. 2 where a portion of the synoil designated as "solvent" is hydrogenated prior to being added to the reactor containing the slurry prepared from carbonaceous feedstock. The hydrogenation step is carried out in accordance with known methods. See for example, U.S. Pat. No. 6,139,723, U.S. Pat. No. 4,379,744, U.S. Pat. No. 4,251,346, U.S. Pat. No. 5,064,527, U.S. Pat. No. 5,783,065, all of which are incorporated herein by reference. In certain embodiments, the hydrogenation of the recycled liquid volume is carried out at a temperature of 300-400° C. In other embodiments, the hydrogenation step is carried out for a period of 10 minutes to an hour at a pressure of 100 to 1000 psi. Following the hydrogenation step, the recycled liquid synoil is added to the reactor as a solvent.

Figure 3:
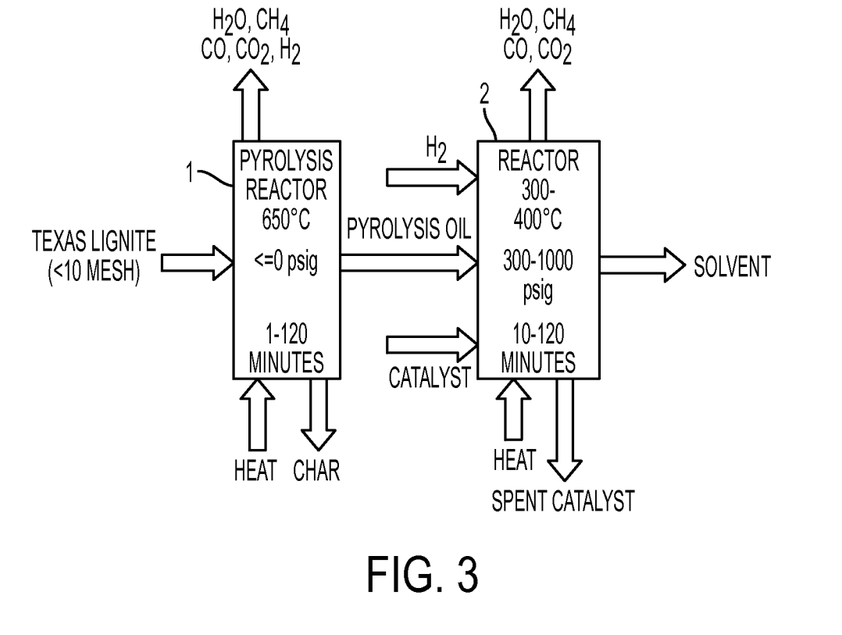
FIG. 3 depicts a schematic diagram for one of the present processes.

FIG. 3 depicts one embodiment of the present processes for the preparation of a solvent that is useful for mixing the carbonaceous feedstock during the preparation of the slurry discussed previously. In a first step of this process, a carbonaceous feedstock is pyrolyzed in a reactor under vacuum conditions (1 atmosphere absolute pressure or less). The pyrolysis reaction is either a fast pyrolysis reaction or a slow pyrolysis reaction. The pyrolysis reaction generates water, char (carbon rich solid fuel), gas and pyrolysis oil as product. The pyrolysis oil generated in this process has a specific gravity between 0.9 and 1.0.

In a second step of the process set forth in FIG. 3, the pyrolysis oil generated in the first step is heated under hydrogen pressure in a suitable reactor at a temperature above 200° C. for a period of up to 2 hours. In certain embodiments, the pyrolysis oil is heated in the presence of an iron-containing catalyst at a temperature of 300-400° C. An oil product that results from the second step may be used as a solvent (oil product solvent) for the carbonaceous feedstock in a process for the liquefaction of the feedstock.

In certain embodiments, the steps of the process for the preparation of synoil are repeated (FIG. 1 and FIG. 2). In some of these embodiments, some or all of the slurry oil used in a repeated mixing step comprises synoil from a previous reacting step.

In certain embodiments, prior to use, the oil product solvent is mixed and diluted with pyrolysis or hydrogenated pyrolysis oils derived from the same carbonaceous feedstock from which the oil product solvent is derived. In other embodiments, the oil product solvent is mixed and diluted with pyrolysis or hydrogenated pyrolysis oils derived from a carbonaceous feedstock that is different from the feedstock that produced the oil product solvent.

In an embodiment, a portion of the synoil obtained from the liquefaction process is removed and reused in the preparation of a slurry of the carbonaceous feedstock. When the synoil is reused, additional solvent may be optionally added to the synoil. In certain embodiments of the invention, the quantity of the synoil that is reused in the liquefaction process ranges from 15% to 85% by volume.

In certain embodiments, the synoil obtained in the liquefaction process is subjected to a separation method. In an embodiment, the synoil is subjected to fractional distillation and the components of the synoil are separated out. One or more of the separated synoil components may be mixed together to provide solvents for use in the preparation of slurries of carbonaceous feedstock.

Figure 4:
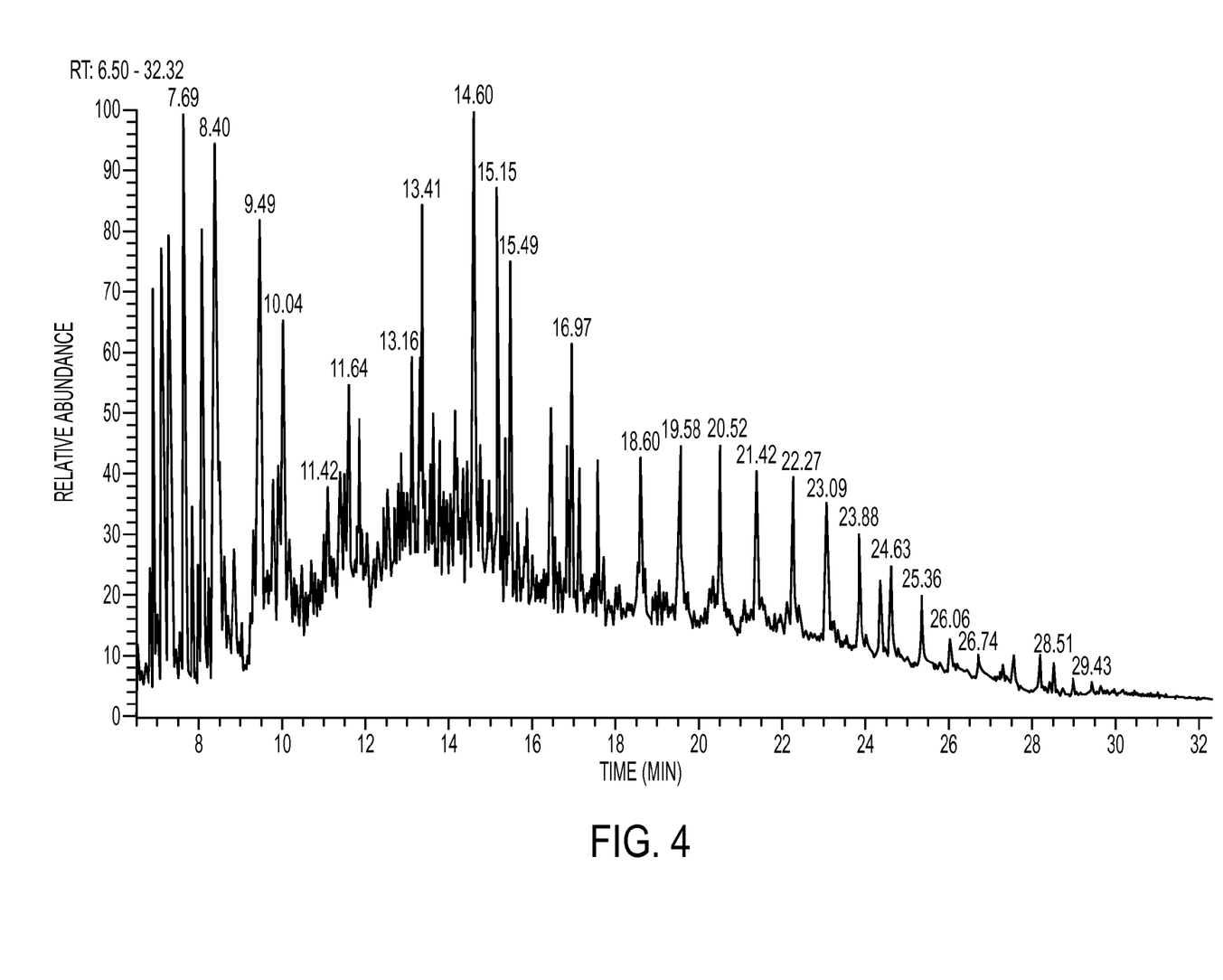
FIG. 4 depicts a chromatogram for pyrolysis oil produced by one of the present processes.
Figure 5:
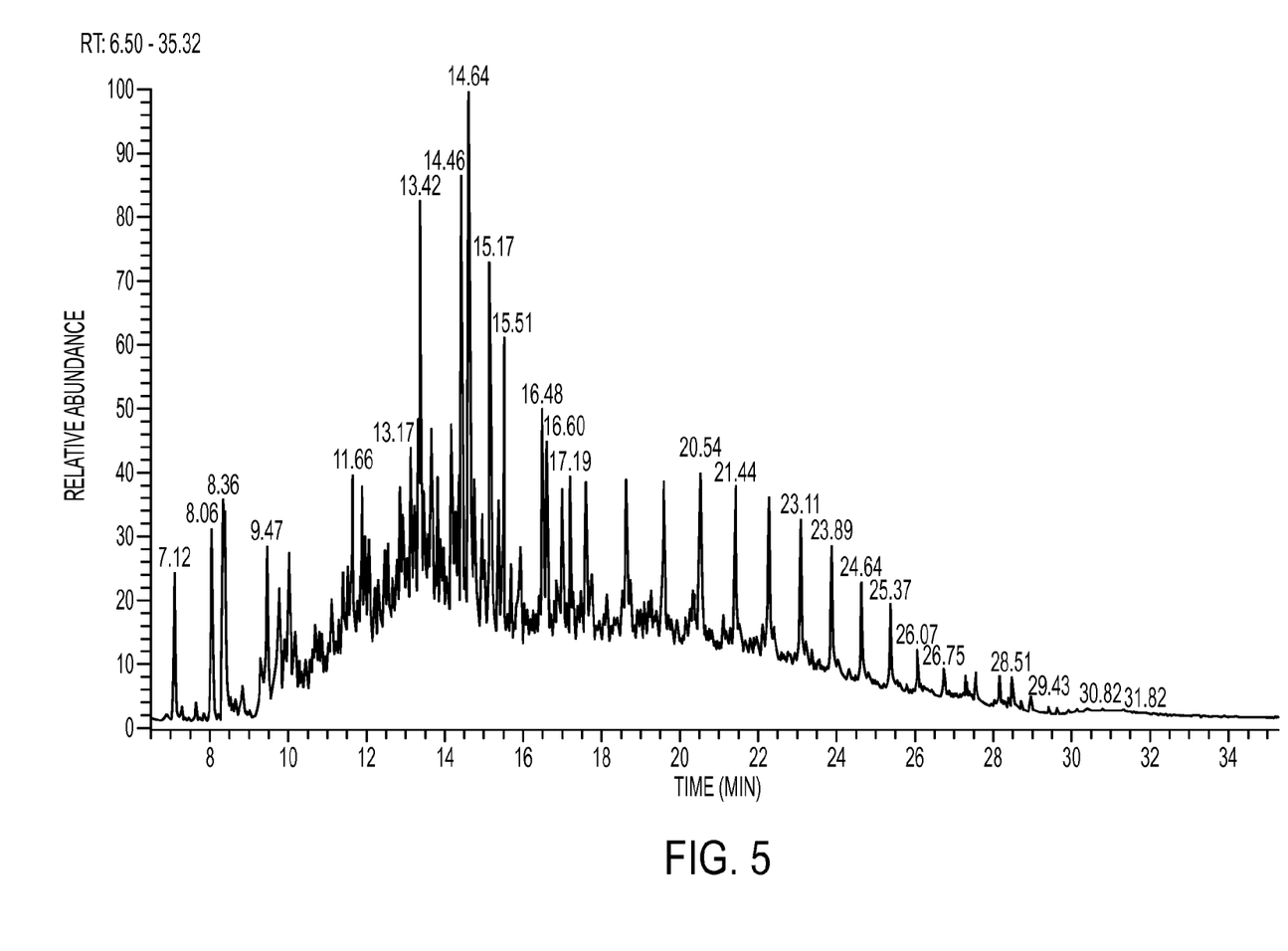
FIG. 5 depicts a chromatogram for hydrogenated pyrolysis oil produced by one of the present processes.
Figure 6:
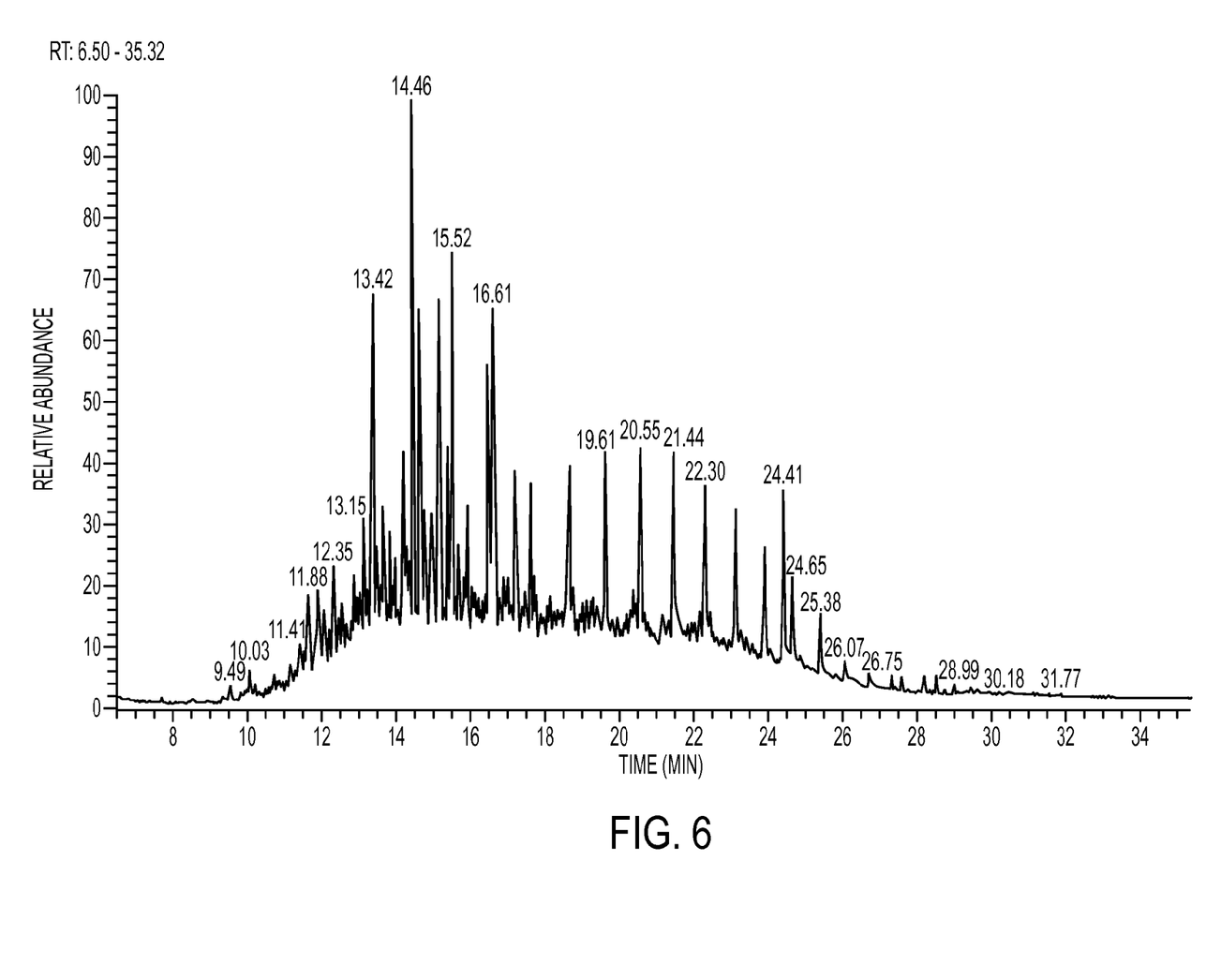
FIG. 6 depicts a chromatogram for synthetic crude oil produced by one of the present processes.

FIGS. 4-6 depict chromatograms for pyrolysis oil, hydrogenated pyrolysis oil, and synthetic crude oil respectively, produced by some embodiments of the processes disclosed herein. The pyrolysis oils contain a significant amount of oxygenated species that are removed in the hydrogenation process. All three oils have a strong aliphatic hydrocarbon distribution, although the synthetic crude has the highest concentration. The distribution of boiling fractions is comparable to petroleum crude oil. Further details are provided in the Working Examples below.

Carbonaceous Feedstocks

A wide variety of carbonaceous materials may be used as feedstocks for the methods disclosed herein, including, but not limited to, lignite, sub-bituminous coal, low-ranked coal, and heavy petroleum. In the case of lignites, the ash content may vary. For example, in some embodiments, it may be less than 37%, preferably, less than 15% on a dry basis. In some embodiments, it is advantageous to remove moisture from the carbonaceous feedstock prior to the mixing step. In some embodiments, the ratio of carbonaceous feedstock to the slurry oils (discussed in greater detail below) is about 1:1 to 1:3 by weight. In some of these embodiments, the iron-containing conversion agent (also discussed in greater detail below) is mixed with a loading factor of from 10% to 30% by weight with the carbonaceous feedstock.

In some embodiments, in the case of lignites, source and composition have an effect on product yield, as discussed further in Example 7. In some embodiments, the lignite would be fresh and have high volatile carbon content and low ash content. In some embodiments, such lignite may need to be cleaned to remove clay and ash, which may be done by methods such as froth flotations, float/sink separation, reverse froth flotation, centrifugation, acid or caustic washes, with or without surfactants, and dry fluidized bed separation.

In certain embodiments, the carbonaceous feedstock material used in the processes is crushed to a particle size of 10-mesh or less, which are particles that can pass through a 10-mesh sieve.

Hydrogenated Pyrolysis Oil and Other Slurry Oils

The carbonaceous feedstock may be mixed with a variety of solvents or slurry oils, including for example, light crude oil, pyrolysis oil, hydrogenated pyrolysis oil, intermediate crude oil, used motor oil, diesel, xylenes, tetralin, aliphatic hydrocarbons or aromatic hydrocarbons or mixtures thereof. In some of the embodiments disclosed herein, hydrogenated pyrolysis oil is an oil that is derived from the pyrolysis of a carbonaceous feedstock followed by a hydrogenation step. Pyrolysis is a thermochemical decomposition of organic material at elevated temperatures in the absence of oxygen, typically occurring under low pressure and at operating temperatures above 430° C. (800° F.). The oil derived from a carbonaceous feedstock that is subjected to pyrolysis is referred to as "pyrolysis oil."

In certain embodiments, the pyrolysis oil is derived from lignite. In other embodiments, the pyrolysis oil derived from lignite is subjected to a hydrogenation step to form a hydrogenated lignite pyrolysis oil.

The initial pyrolysis oil, e.g., the pyrolysis oil used for the first one or more process cycles, may be made by rapidly heating lignite or other carbonaceous material in the absence of oxygen. In this embodiment, 80 mL of oil can be produced from 1.0 kg of lignite. Such an oil may be further hydrogenated using conventional techniques to produce an effective lignite/subbituminous solvent, which is also referred to as hydrogenated pyrolysis oil herein. In some embodiments, hydrogenated pyrolysis oils are obtained from processes comprising heating the carbonaceous feedstock in the absence of oxygen to produce a pyrolyzed lignite oil, and hydrogenating some or all of the pyrolyzed lignite oil with hydrogen in the presence a conversion agent to produce the hydrogenated pyrolysis oil. Suitable reducing conditions include heating at temperatures from 250° C. to 350° C., $H_2$ pressures from 400 psi to 700 psi and reaction times from 30 to 360 minutes. Catalysts that may be used for the hydrogenation/reduction include, for example, the iron-containing conversion agents described below. In some embodiments, the catalyst comprises 5-40% by mass metallic iron on alumina support.

Suitable hydrogenated pyrolysis oils that may be used with the methods disclosed may be characterized by some or all of the following properties, including a boiling range between 80 to 600° C. as determined using the ASTM 2887 protocol, which is incorporated herein by reference, and/or an elemental composition comprising 80 to 85% carbon by mass and 8 to 12% hydrogen by mass.

In subsequent cycles of the method, the hydrogenated pyrolysis oils may comprise synoil resulting from the methods provided herein. For example, some or all of the slurry oil used in a repeated mixing step may comprise synoil from a previous reacting step.

Iron-Containing Conversion Agent

A broad range of iron containing conversion agents are compatible with the liquefaction methods disclosed herein, including, for example, substances derived from bauxite, red mud, iron oxide(s), and/or various iron-containing salts deposited on alumina. Suitable iron containing conversion agents will have iron contents from 5% to 40% by weight in some embodiments and/or have an average particle size of 60 to 300 mesh.

In the case of bauxite, the substance may be prepared by a process comprising crushing bauxite ore. Bauxite is a general term for a rock composed of hydrated aluminum oxides and is usually found containing up to 30% iron oxides. Typically, bauxite is mostly comprised of the minerals gibbsite $Al(OH)_3$, boehmite γ-AlO(OH), and diaspore α-AlO(OH), in a mixture with two iron oxides, goethite and hematite, the clay mineral kaolinite, and small amounts of anatase $TiO_2$. Typical mesh sizes for the crushed bauxite particles will range from 60 to 300 mesh. Once they are crushed, the bauxite particles may be calcined in some embodiments, for example, at 300 to 600° C. in the presence of oxygen to produce calcined bauxite particles. Reduction of crushed bauxite or calcined bauxite particles with $H_2$ produces iron-containing conversion agents. In some embodiments, the reducing further comprises heating the bauxite particles to about 250° C. to 400° C. and an $H_2$ pressure is from 0.5 psi to 1,000 psi. Under such conditions, calcined bauxite particles will typically be reduced in about 30 to 180 minutes.

Iron-containing conversion agents may also be prepared by wetting $Al_2O_3$ particles with aqueous solutions of iron salts to generate iron-alumina compositions. Examples of suitable iron salts include: iron(III) nitrate, iron (III) chloride, iron (III) citrate, iron (II) chloride, iron (II) sulfate, iron (II) ammonium sulfate, and combinations and/or hydrates thereof. Calcining the iron-alumina composition at, for example, at from 300° C. to 600° C. in the presence of oxygen may then be used to produce a calcined iron-alumina composition, which can then be reduced with $H_2$ to produce the desired iron-containing conversion agents. Suitable reducing conditions include temperatures from 250° C. to 400° C., $H_2$ pressure from 0.5 psi to 1000 psi and reaction times from 30 to 180 minutes.

Substances derived from red mud may also serve as suitable iron containing conversion agents. Red mud is composed of a mixture of solid and metallic oxide-bearing impurities, and is typically a disposal problem for the aluminum industry. The red color is attributed to oxidized iron (rust), which can account for up to 60% of the mass of the red mud. In addition to iron oxide, e.g., $Fe_2O_3$, red mud typically comprises silica ($SiO_2$), residual aluminum, alumina ($Al_2O_3$) and titanium oxide. In some embodiments, the iron oxide content of the red mud is 30% to 60% by mass. In some embodiments, the $Al_2O_3$ content of the red mud is 10% to 20% by mass. In some embodiments, the $SiO_2$ content of the red mud is 3% to 50% by mass.

Further preparation steps include, for example, calcining the red mud particles at 300 to 600° C. in the presence of oxygen to produce calcined red mud particles, and then reducing the calcined red mud particles with $H_2$ to produce the iron-containing conversion agent. Suitable reducing conditions include temperatures from 250° C. to 400° C., $H_2$ pressure from 0.5 psi to 1,000 psi and reaction times from 30 to 180 minutes.

Other suitable types of iron-containing conversion agents may also be derived from the solids separated from the reaction-product mixture. In some embodiments, the iron-containing conversion agents comprise metallic iron finely dispersed on a substrate of aluminum oxide having an average particle size of 60-300 mesh.

In some embodiments, the iron-containing conversion agent is made by crushing bauxite ore having an iron content between 5 and 40% by mass, to particles with a mesh size of 60-300 mesh. These crushed particles are then washed with water, dried in air, calcined at 300° C. for approximately 30 min Afterwards the iron content in the particles is reduced to metallic iron at 300° C. by addition of $H_2$ gas (0.5 psi to 1000 psi).

In some embodiments, the iron-containing conversion agent is disposable. In other embodiments, it may be isolated from the solid by-products and regenerated by back addition of iron salts, calcining, and hydrotreatment. In this aspect, it may be used in a catalytic fashion. In still further embodiments, the solid by products may be isolated and sold as a bauxite-type ore.

Iron-containing conversion agent comprising both aluminum oxide and metallic iron may be used in some embodiments to improve liquefaction yields. For example, a liquefaction run using 3 g iron-containing conversion agent and 25 g lignite coal gave synoil yields of up to 50% of the theoretical value that may be expected from the carbon content of the lignite feedstock (MAF yield). This is compared to a yield of up to 20% MAF yield when the same process is repeated in the absence of this iron-containing agent.

Hydroconversion Reactions

In some embodiments, the methods disclosed herein combine the hydrogenation and liquefaction of the carbonaceous material in a single step. By combining these two steps, it is possible to avoid the need for a separate hydrogenation step to recharge the solvent, which in turn reduces equipment and operating costs. Also, the $H_2$ pressures utilized in some of the embodiments are significantly less than the pressures used in current commercial coal-to-liquids processes.

An example of a suitable process for the liquefaction of a carbonaceous feedstock can be summarized as comprising the following: (a) mixing and dispersion of the feedstock in a slurry oil in a 1:2 mass ratio, (b) addition of an iron-containing conversion agent with a loading factor of 10-30% by mass with respect to the feedstock mass, (c) placing the resulting slurry under a hydrogen atmosphere in a pressure vessel and rapidly heating to 280-450° C. and adjusting the partial pressure of hydrogen to 700 to 1,200 psi hydrogen at maximum temperature, (d) agitating mechanically with a residence time of 10-30 min at maximum temperature, and (e) separating the solids and water from the resulting liquid, which will be present in greater amounts than that of the initial slurry oil by 110% to 140% by weight. The liquid (synoil) will be comparable to a medium sweet crude oil.

Suitable reactors for the hydroconversion reactions include continuous flow or batch hydrogenation reactor technology. Scaling up the processes disclosed herein should enable the production of, for example, 1,000 to 20,000 barrels of synoil per day. In some embodiments, the hydroconversion reactions may be used to convert 35 to 75% of the carbon content in the original solid feedstock to a liquid product. For coal this corresponds to synoil yields of 40% to 80% by mass based on moisture, ash-free (MAF) coal. This MAF yield is comparable to current processes, as shown in Table 1, and it may be more economical.

TABLE 1

MAF Yield of Current Coal Extraction Processes

| Process | MAF % yield | Typical feedstock |
|---|---|---|
| Invention | 51 | Lignite |
| Solvent Refined Coal (SRCI&II) (USA)* | 54 | Subituminous |
| H-coal Process (USA)* | 65 | Bituminous |
| Exxon EDS (USA)* | 35 | Bituminous |
| Kohloel (Germany)* | 75 | Bituminous |
| BCL-NEDOL (Japan)* | 52 | Subituminous |
| Shenhua (China)* | 57 | Subituminous |

Kabe, T., Ed., 2004. Studies in Surface Science and Catalysis: Coal and Coal-Related Compounds, Elsevier, Amsterdam.

In some embodiments, only mild pressure and temperature are needed (around 320° C. and 1000 psi of $H_2$). In some embodiments, a digestion time of 20 to 30 minutes is optimal. In some embodiments, lignite quality is important (specifically lignite should be fresh and have a low ash and high volatility content). In some embodiments, the removal of moisture from the lignite is optional. In some embodiments, a catalyst is preferred; for example, Fe/alumina may be used.

Synthetic Oil (Synoil)

Oils produced though pyrolysis of lignite, without isolating specific boiling fractions, are effective solvents for the liquefaction of lignite/subbituminous coal. In addition, the liquids obtained through pyrolysis can be hydrogenated with mild process conditions (<1,000 psi) compared to processes used to hydrogenate coal tar distillates derived from bituminous and subbituminous coals, which typically require $H_2$ pressures >2,500 psi.

The methods disclosed herein provide a process that may be used to produce higher proportions of mid-weight hydrocarbons (boiling range 200° C. to 500° C.) and lower proportions of the less desirable light (gases, naphthas) and high molecular weight hydrocarbons (waxes, asphaltenes) than the other reported processes. In an embodiment, a profile for a synoil generated by the process comprises approximately 2% naphtha, approximately 20% kerosene, approximately 30% diesel and approximately 40% lubrication oils and asphaltenes.

Compared to crude petroleum, the synoil may have lower amounts of trace elements that can make refining more difficult, as detailed further in Example 8. The concentrations of these trace elements and carbon, nitrogen, and hydrogen can be traced from the lignite and the hydrogenated pyrolysis oil to the synoil and the inertinite (solid waste). The composition of synoil produced by an embodiment of the processes enclosed herein resembles that of common fuels, such as diesel and Jet-A. Synoil having such properties are typically more desirable to a refinery, since the refinery can in turn produce more high value diesel and jet fuel products from the same amount of starting material.

Figure 7:
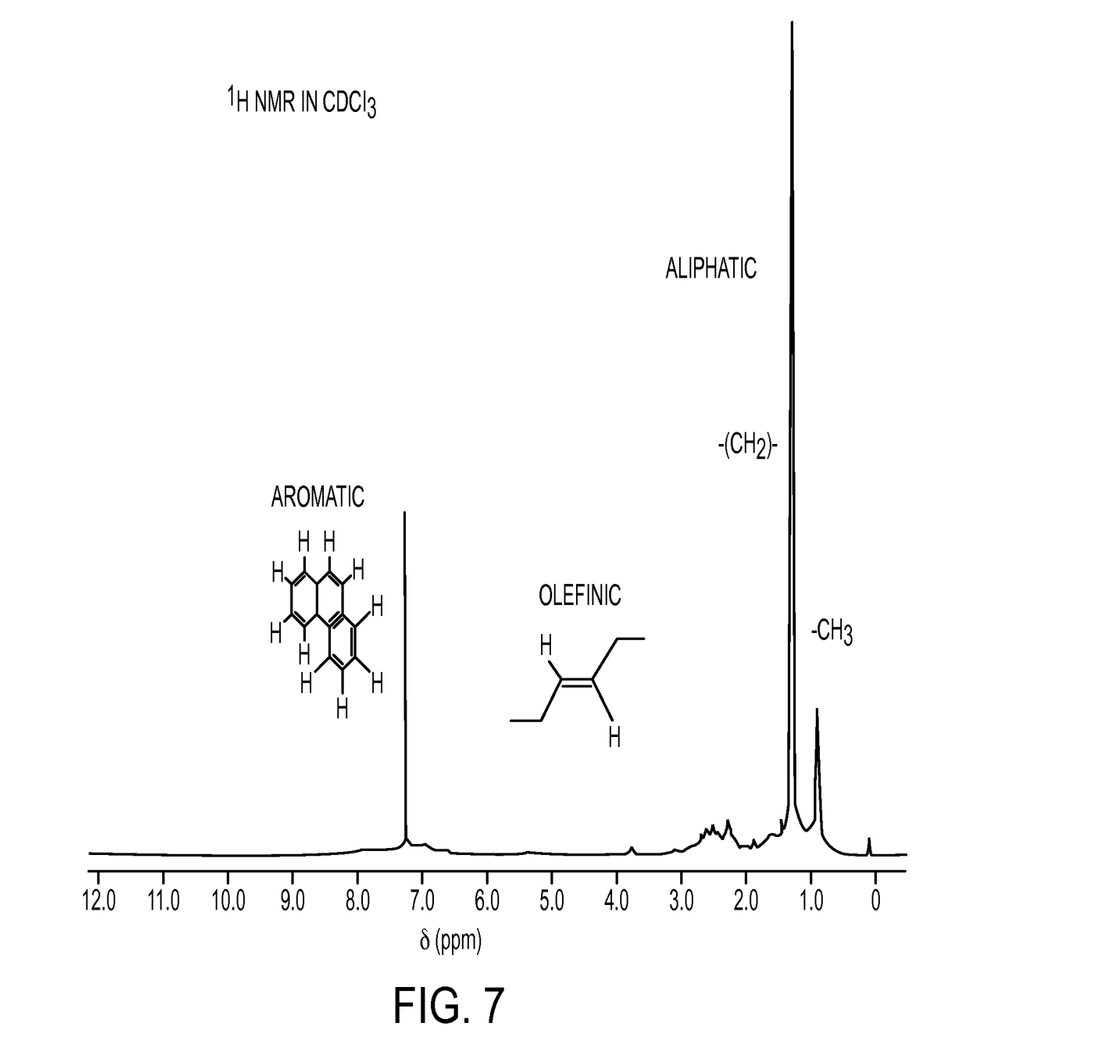
FIG. 7 depicts an exemplary $^1$H NMR of a synoil produced by one of the present processes.

FIG. 7 depicts an exemplary $^1H$ NMR of a synoil produced by one embodiment.

Table 2 shows estimated refinery products of the synoil made by an embodiment of the methods disclosed herein. This is comparable to the yield of crude petroleum alternatives.

TABLE 2

Simulated Refinery Yields for Synoil
Maximum Jet Production

| Product Cut | CTL SynOil Raw Yield | | CTL SynOil Hydrocracked Yield | |
|---|---|---|---|---|
| | Max Jet (BPD) | Vol % | Max Jet (BPD) | Vol % |
| Gas | 0 | 0.0% | 34 | 3.1% |
| Gasoline | 7 | 0.7% | 174 | 16.0% |
| Jet | 209 | 20.9% | 526 | 48.3% |
| Diesel | 269 | 26.9% | 269 | 24.7% |
| Gas Oil | 429 | 42.9% | 0 | 0.0% |
| Resid/HFO | 86 | 8.6% | 86 | 7.9% |
| Total | 1000 | 100.0% | 1089 | 100.0% |

The environmental cost of making Jet-A (JP-8) fuel using an embodiment of the process disclosed herein can be calculated, in some embodiments, by comparing air pollutants produced, water pollutants produced, and environmentally beneficial waste products produced compared to alternatives.

The synoil yields of the current process range from 40 to 80% by mass of the available carbon and hydrocarbons in the lignite or subbituminous coal feedstock being converted into synoil (MAF yield) which is comparable with most of the existing CTL processes reported in the literature; however, the process conditions disclosed herein are significantly milder and therefore more economical. Typical temperature and pressure process conditions for the processes disclosed herein range from 280-450° C. and 700-1200 psi, whereas typical pressures for other reported processes are in excess of 2000 psi and temperatures are usually between 380-500° C.

In some embodiments, it may be desirable or even necessary to removing water from the reaction-product mixture in order to generate a substantially water-free synoil.

Synoil may be characterized in some embodiments by one or more of the following parameters: a specific gravity of 0.84 to 1.00 g/mL and an API gravity between 37 and 10, a sulfur content of less than 1.0% sulfur by mass, and kinematic viscosity of less than 15.0 cSt at 38° C.

Moreover, in some embodiments, the synoil may be characterized by its boiling range. For example, the methods provided herein may be used to produce synoil wherein 90% of the synoil boils below 538° C. as determined using the ASTM 5307 protocol, which is incorporated herein by reference.

Synoil may also be characterized by its elemental composition. For example, the methods of the present disclosure may be used to synthesize synoil having an elemental composition comprising 82% to 86% carbon by mass and 10% to 14% hydrogen by mass.

Solubility in other solvents may also be used to characterize synoil. In some embodiments, the synoil is readily soluble in toluene and heptane.

Table 3 sets forth a summary analysis of the properties and characteristics of the synoil generated from lignites.

TABLE 3

Summary Analysis of Synoil from Lignites

| Acid number (TAN) | 3.46 | KOH/g |
|---|---|---|
| Elemental | | |
| Carbon | 81.7 | WT % |
| Hydrogen | 9.88 | WT % |
| Nitrogen | 0.44 | WT % |
| Oxygen | 5.78 | WT % |
| Sulfur | 0.645 | WT % |
| Metals | | |
| Nickel | <49 | ppm |
| Vanadium | 25.4 | ppm |
| Mercury | <2 | ppm |
| SARA | | |
| Asphaltenes | 18 | WT % |
| Saturates | 17.5 | WT % |
| Aromatics | 61.2 | WT % |
| Resins | 3.3 | WT % |
| Simulated Distillation | | |
| IBP | 251 | ° F. |
| 5% off | 399 | ° F. |
| 10% off | 440 | ° F. |
| 15% off | 475 | ° F. |
| 20% off | 503 | ° F. |
| 25% off | 529 | ° F. |
| 30% off | 558 | ° F. |
| 35% off | 584 | ° F. |
| 40% off | 620 | ° F. |
| 45% off | 655 | ° F. |
| 50% off | 693 | ° F. |
| 55% off | 731 | ° F. |
| 60% off | 766 | ° F. |
| 65% off | 799 | ° F. |
| 70% off | 830 | ° F. |
| 75% off | 864 | ° F. |
| 80% off | 914 | ° F. |
| 85% off | 987 | ° F. |
| 90% off | 1070 | ° F. |
| 95% off | — | ° F. |
| % Recovered | 85.8 | @1000° F. |
| % Residue | 14.2 | @1000° F. |

Oil Product Solvent

In certain embodiments, a solvent is derived from the pyrolysis of a carbonaceous feedstock coupled with the treatment of the resulting pyrolysis oil with an iron-containing conversion agent. This solvent may be used to prepare a slurry of a carbonaceous feedstock. A further embodiment is directed to a carbonaceous composition comprising a material formed from the pyrolysis of a carbonaceous feedstock.

In a first step of the process for preparing an oil product solvent, a carbonaceous feedstock is pyrolyzed in a reactor under low pressure conditions (1 atmosphere absolute pressure or less). The pyrolysis reaction is either a fast pyrolysis reaction or a slow pyrolysis reaction. The pyrolysis reaction generates water, char (carbon rich solid fuel), gas and pyrolysis oil as product. The pyrolysis oil generated in this process has a specific gravity between 0.9 and 1.0.

In a second step of the process, the pyrolysis oil generated in the first step is heated under hydrogen pressure in a suitable reactor at a temperature above 200° C. for a period of up to 2 hours. In certain embodiments, the pyrolysis is heated in the presence of an iron-containing catalyst at a temperature of 300-400° C. An oil product that results from the second step may be used as a solvent for the carbonaceous feedstock in a process for the liquefaction of the feedstock.

In certain embodiments, prior to use, the oil product solvent is mixed and diluted with pyrolysis or hydrogenated pyrolysis oils derived from the same carbonaceous feedstock from which the oil product solvent is derived. In other embodiments, the oil product solvent is mixed and diluted with pyrolysis or hydrogenated pyrolysis oils derived from a carbonaceous feedstock that is different from the feedstock that produced the oil product solvent.

In an embodiment, the oil product solvent derived from a particular feedstock has a chemical profile that is similar to the synoil derived from the same feedstock.

An embodiment is directed to a solvent comprising between 40-60% of aromatic compounds. In certain embodiments, the solvent comprises between 40-60% of saturated compounds.

Suitable solvents that may be used with the methods disclosed may be characterized by some or all of the following properties, including a boiling range between 80 to 600° C. as determined using the ASTM 2887 protocol, which is incorporated herein by reference and/or an elemental composition comprising 80 to 85% carbon by mass and 8 to 12% hydrogen by mass.

Any embodiment of any of the present systems and/or methods can consist of or consist essentially of—rather than comprise/include/contain/have—any of the described steps, elements, and/or features. Thus, in any of the claims, the term "consisting of" or "consisting essentially of" can be substituted for any of the open-ended linking verbs recited above, in order to change the scope of a given claim from what it would otherwise be using the open-ended linking verb.

Other objects, features and advantages of the present disclosure will become apparent from the following working examples. It should be understood, however, that the detailed description and the specific examples, while indicating specific embodiments, are given by way of illustration only, since various changes and modifications within the spirit and scope of the present processes and compositions will become apparent to those skilled in the art from this detailed description.

WORKING EXAMPLES

The following examples are included to demonstrate preferred embodiments. It should be appreciated by those of skill in the art that the techniques disclosed in the examples that follow represent suitable techniques for practicing embodiments of the present processes. However, those of skill in the art should, in light of the present disclosure, appreciate that many changes can be made in the specific embodiments which are disclosed and still obtain a like or similar result.

Example 1

Hydroconversion of Lignite

Lignite (23% moisture; 9% ash; 28% volatiles; 40% fixed carbon) from Jewett, Tex. (25 g) was placed in a 450 mL Parr reactor with 50 mL hydrogenated pyrolysis oil. Moisture was removed from the mixture by heating above 100° C. under flowing hydrogen. The vessel was sealed and the reactants were heated and stirred. The mixture was heated to 375° C. for 30 min. and then cooled. The slurry was diluted with THF and filtered to remove the solids. Approximately, 1.8 g synoil (11% MAF yield) was obtained.

Example 2

Hydroconversion of Texas Lignite at 1,000 psi $H_2$

About 25 g of lignite (23% moisture; 9% ash; 28% volatiles; 40% fixed carbon) placed in 49 g of hydrogenated pyrolysis oil with 3 g of 25% iron on alumina co-reagent called BXF1. The mixture was placed in a 450 mL Parr pressure reactor and charged with 400 psi of hydrogen gas at room temperature. The reactor was sealed and heated to 350° C. while stirring for 3 hours. The pressure reached 1000 psi. Here the moisture was not removed from the lignite before placing it in the reactor. The slurry was then cooled and filtered. About 55 g of oil was collected with 3 g of solid residue remaining (excluding co-reagent weight). This represents a 35% synoil yield based on moisture, ash-free (MAF) coal.

The experiment was repeated. In this case, 50 g of hydrogenated pyrolysis oil was used, other amounts were the same as previous run. The mixture was brought to 320° C. for 2 hours while stirring. About 56.5 g of oil was recovered (38% MAF yield).

Example 3

Hydroconversion of Lignite from Luminant

Lignite from Luminant (30% moisture, 8% ash, 29% volatiles, 33% fixed carbon) was crushed and sieved to 16 mesh. Twenty-five grams of this lignite was added to 40 g of hydrogenated pyrolysis oil and 3 g of 25% iron on alumina co-reagent. The vessel was sealed and charged with 300 psi $H_2$ at room temperature, the mixture was brought to and held at 320° C. for 30 min while stirring. During this time the pressure reached a maximum value of 900 psi. After cooling and work-up, 47 g of oil was recovered (48% MAF yield). The carbon, hydrogen and nitrogen content of the hydrogenated pyrolysis oil was 85.2%, 10.2%, and 4.7% by mass, respectively. The carbon, hydrogen and nitrogen content of the oil recovered at the end of the experiment was 85.7%, 9.0%, and 6.5% by mass, respectively.

Lignite from Luminant (30% moisture, 8% ash, 29% volatiles, 33% fixed carbon) was crushed and sieved to 16 mesh. Twenty-five grams of this lignite was added to 50 g of hydrogenated pyrolysis oil and 3 g of 25% iron on silica co-reagent. The mixture was brought to and held at 320° C. for 30 min while stirring. After cooling and work-up, 53 g of oil was recovered (20% MAF yield). The carbon, hydrogen and nitrogen content of the hydrogenated pyrolysis oil was 85.2%, 10.2%, and 4.7% by mass, respectively. The carbon, hydrogen and nitrogen content of the oil recovered at the end of the experiment was 68.3%, 8.1%, and 3.0% by mass, respectively.

Example 4

Hydroconversion with Bauxite from Arkansas

Bauxite from Arkansas was crushed into fine powder (~200 mesh) and reduced at 300° C. under 17 psi $H_2$. The resulting solid was called BXF9. About 25 g of lignite coal from Luminant (30% moisture, 8% ash, 29% volatiles, 33% fixed carbon; 16 mesh) was mixed with the BXF9 co-reagent (3 g) and 50 g of hydrogenated pyrolysis oil in a 450 mL Parr vessel. The reactor was sealed, charged with 300 psig of $H_2$ and heated to 320° C. The temperature was held for 30 minutes while stirring at 150 rpm, during which time the pressure reached 1000 psi. After cooling and work-up, 59 g of oil remained (59% MAF yield). The carbon, hydrogen and nitrogen content of the hydrogenated pyrolysis oil was 85.2%, 10.2%, and 4.7% by mass, respectively. The carbon, hydrogen and nitrogen content of the oil recovered at the end of the experiment was 84.3%, 9.0%, and 5.9% by mass, respectively.

Lignite from Luminant was crushed and sieved to 16 mesh and dried in a vacuum oven at 60° C. to 2% moisture or less. Eighteen grams of this lignite was added to 50 g of hydrogenated pyrolysis oil and 3 g of 25% iron on alumina co-reagent. The reactor was sealed, charged with 300 psi of $H_2$ and heated to 320° C. The mixture was held at 320° C. for 30 min while stirring during which the pressure rose to a maximum of 900 psi. After cooling and workup, 58 g of oil was recovered (52% MAF yield).

Example 5

Scale Up

A larger scale reaction of 400 g lignite (20% moisture, 1% ash, 40+ mesh from NRG) was slurried with 812 g hydrogenated pyrolysis oil and 48 g of 25% iron on alumina co-reagent in a 2 gallon pressure reactor. The head space was charged with 234 psi $H_2$ gas. The mixture was heated at 15° C./min to a final temperature of 320° C. at which it was held for 30 min while stirring continuously at 150 rpm. Once the temperature reached 320° C., additional $H_2$ was introduced to make the reactor pressure 1000 psi. After cooling and work-up, 923 g of oil was recovered (49% MAF yield). The carbon, hydrogen and nitrogen content of the hydrogenated pyrolysis oil was 85.6%, 9.8%, and 3.9% by mass, respectively. The carbon, hydrogen and nitrogen content of the oil recovered at the end of the experiment was 82.5%, 9.0%, and 4.7% by mass, respectively.

A second larger reaction was performed with identical amounts with a higher yield of 51.8%) (933 g of oil recovered). The carbon, hydrogen and nitrogen content of the hydrogenated pyrolysis oil was 83.83%, 9.72%, and 2.72% by mass, respectively. The carbon, hydrogen and nitrogen content of the oil recovered at the end of the experiment was 81.22%, 9.28%, and 2.43% by mass, respectively.

A reaction identical to the first large reaction was carried out at the smaller scale (25 g lignite, 50 g hydrogenated pyrolysis oil, and 3 g co-reagent Fe on alumina) using the same reagents. This small scale reaction gave 53 g oil recovered or a 20% MAF yield. This result suggests that there may be increases in yield upon scale-up.

Example 6

Slurry Oil Hydrogenation

Factors such as time, pressure, and catalyst composition were examined to determine slurry oil varieties made by hydrogenation of synoil or pyrolysis oil. Pyrolysis oil or synoil of the composition shown in Table 4 was reacted with the given catalyst and support at the given temperature and pressure for the given time. The resulting slurry oil with catalyst, recovered at the yield and composition shown, could be mixed with a carbonaceous feedstock and then reacted to form synoil. In some embodiments, alumina was found to be a more effective support than carbon, but certain other variables resulted in similar yields, allowing for optimization based on costs.

TABLE 4

Hydrogenation of Pyrolysis Oil or Synoil into Slurry Oil

| Run | Starting Solvent: C %, H % | T (C) | P (psi) | Catalyst/support | Time (h) | Yield | C % H % After |
|---|---|---|---|---|---|---|---|
| 1 | Pyrolysis oil 64.6; 9.5 | 300 | 400 | 10% Pd/C | 12 | 44 | 83.2; 9.0 |
| 2 | Pyrolysis oil 74.8; 9.1 | 300 | 1000 | 10% Pd/alumina | 8 | 63 | 83.0; 8.9 |
| 3 | Synoil 80.7; 8.3 | 300 | 400 | 10% Pd/alumina | 8 | Not determined | 83.6; 9.6 |
| 4 | Pyrolysis oil 72.0; 10.0 | 300 | 500 | 10% Pd/alumina | 8 | 70 | 84.4; 10.4 |
| 5 | Pyrolysis oil 72.5; 9.3 | 300 | 700 | 25% Ni/alumina | 8 | 71 | 84.9; 9.9 |
| 6 | Pyrolysis oil 73.2; 9.6 | 300 | 400 | 10% Pd/alumina | 8 | 80 | 83.5; 10.2 |
| 7 | Pyrolysis oil 77.9; 10.8 | 300 | 700 | 25% Fe/alumina | 8 | 80 | 84.0; 10.1 |

Example 7

Lignite Digestion

Once a hydrogenated pyrolysis oil or synoil is made, lignite is slurried in this oil under a hydrogen atmosphere at various temperatures and pressures in the presence or absence of a catalyst, yielding synoil after work-up. Many variables were considered including lignite source, composition, and inherent moisture; type of catalyst; type of catalyst support; temperature; pressure; hydrogen partial pressure; steam partial pressure; rate of heating and cooling; stirring rate; lignite particle size, solvent to lignite ratio; and catalyst to lignite ratio. Select results are shown in Table 5.

TABLE 5

Lignite Digestion Varieties

| Run | Lignite (g) | Solvent (g) | Oil Recv'd (g) | Max Yield (g) | Oil Yield g (%) | Slurry oil C % H % Before | Synoil CH % After | Notes |
|---|---|---|---|---|---|---|---|---|
| 3[#] | 25.0 LAL | ~40 | 42 | 17.0 | 2 g (12%) | 83.0; 8.9; | 80.7; 8.3 | Moisture removed in solvent, no added conversion agents. Heat to 320° C. for 30 min |
| 8[#] | 25.0 LAL | 49.0 | 55.0 | 17.0 | 6.0 g (35%) | 83.2; 10.8 | 81.0; 9.9 | 3.0 g BXF1 w/H$_2$O w/300 psi H$_2$ at 25° C. Heat to 320° C. for 30 min |
| #21 | 25 LAL | 50 | 51.5 | 17 | 1.5 (8%) | 86.5; 10.2 | 85.1; 9.9 | 3.0 g ironsulfide (FeS) 100 mesh 300 psi H$_2$, at 25° C. Pressure reached at 1350 psi at 340° C. Heated for 30 min |
| #22 | 25 LAL | 50 | 42.9 | 17 | −8 | 86.5; 10.2 | 84.4; 10.2 | No added conversion agent. Max pressure was 1000 psi with H$_2$ at 320° C. for 30 min. |

TABLE 5-continued

Lignite Digestion Varieties

| Run | Lignite (g) | Solvent (g) | Oil Recv'd (g) | Max Yield (g) | Oil Yield g (%) | Slurry oil C % H % Before | Synoil CH % After | Notes |
|---|---|---|---|---|---|---|---|---|
| #23 | 25 NRG | 50 | 57.5 | 16.2 | 7.5 (46%) | 86.5; 10.2 | 85.1; 9.8 | 3.0 g BXF1, 320° C. for 30 min. Max pressure was 800 psi $H_2$ |
| #24 | 25 LAL | 50 | 54.2 | 17 | 4.2 (25%) | 84.6; 9.8 | 84.2; 9.9 | 3.0 g metallic Fe(1-3 micron), 320° C. for 30 min. 800 psi $H_2$ at 320° C. Heat for 30 min. |
| #25 | 25 LAL | 50 | 54.5 | 17 | 4.5 (26%) | 84.6; 9.8 | 85.3; 10.8 | 3.0 g metallic Fe (325 mesh), 700 psi $H_2$ at 320° C. for 30 min |
| #36 | 25 NRG | 50 | 60 | 16.2 | 10 (61.7%) | 84.8, 8.7 | 85.2, 10.8 | 3.0 g BXF1, 300 psi w/$H_2$ at 25° C. Heat to 320° C., regular rpm (150), fast heating (30-40 min) |
| #37 | 25 NRG | 50 | 57 | 16.2 | 7 (43.2%) | 84.8, 8.7 | 85.1, 10.2 | 3.0 g BXF1, 300 psi w/$H_2$ at 25° C. Heat to 320° C. for 30 min., regular rpm (150), BXF1 added after removing $H_2O$ |
| #45 | NRG 16 mesh | 50 | 56.8 | 16.2 | 6.8 (42%) | 85.2, 10.25 | 81.17, 9.01 | 3.0 g BXF1, 300 psi w/$H_2$ at 25° C. Heat 320° C. for 30 min., regular rpm, regular heating and cooling |
| #49 | Luminant 216 mesh | 50 | 59 | 15.4 | 9 (58%) | 85.2, 10.25 | 84.3, 8.95 | 3.0 g BXF9, 300 psi w/$H_2$ at 25° C. Heat at 320° C. for 30 min. regular rpm, fast heating and cooling |
| #50 | NRG 16 mesh | 50 | 53 | 16.2 | 3 (18%) | 85.2, 10.25 | 83.9; 10.5 | 2 g BXF1, 300 psi w/$H_2$, Heated to 320° C. for 30 min, regular rpm, fast heating and slow cooling |
| #51 | LAL | 50 | 50 | 17 | 0 (0%) | 84.6; 10.5 | 84.1; 10.2; | 3 g BXF1, pressurized to 300 psi w/syngas (1 CO: 2 $H_2$) and heated to 320° C. for 30 min. Max pressure was 1000 psi. |
| #52 | Luminant 2 16 mesh | 50 | 53 | 15.4 | 3 (20%) | 85.2, 10.25 | 68.28, 8.10 | 3.0 g 25% metallic Fe on deposited on $SiO_2$, 300 psi w/$H_2$ at 25° C., then heated to 320° C. for 30 min, regular rpm, fast heating and cooling |

A typical run consisted of loading 25 g of lignite (with known ash and moisture content, shown in Table 4) into a 450 mL Parr pressure reactor with 50 g of slurry oil and various amounts of BXF1 or other conversion agent. The reactor was sealed and charged with different partial pressures of hydrogen. The reactor was then heated to the desired temperature for 30 min with stirring at 100 rpm. After cooling and work-up, the product is analyzed. Best yields were typically found with mild temperature and pressure, 20-30 minute digestion time, and Fe/alumina conversion agent.

Yields also depended on the type of coal, as shown in Table 5. Removal of moisture in the lignite was optional, but the freshness, ash content (lower the better) and volatility (higher the better) were significant. The results in Table 6 can thus be explained by the compositional analysis in Table 7.

TABLE 6

Synoil Yields and Lignite Source

| Coal | Oil Yield % |
|---|---|
| Luminant 2 (TX) | 51% |
| NRG (TX) | 49% |
| Jewett (TX) LAL | 38% |
| Benton (AR) | 33% |
| Malvern (AR) | 9% |

TABLE 7

Proximate Analysis of Lignite Coals

| Lignite Source | % moisture | % volatiles | % fixed carbon | % ash |
|---|---|---|---|---|
| Jewett | 31 | 31 | 23 | 15 |
| LAL (from Jewett) | 23 | 28 | 40 | 9 |
| Benton | 34 | 39 | 20 | 7 |
| Malvern (old) | 32 | 25 | 18 | 26 |
| NRG | 24 | 31 | 34 | 11 |
| Luminant 1 (L1) | 29 | 21.8 | 31.5 | 17.7 |
| Luminant 2 (L2) | 30 | 29 | 32.5 | 8.5 |

Example 8

Characterization of Synoil

Lignite is slurried with hydrogenated pyrolysis oil under a hydrogen atmosphere in the presence of a conversion agent under varied temperature and pressure, resulting in synoil. This synoil is then tested and determined to have an elemental composition of between 80 and 85% carbon, 7 to 10% hydrogen, and 0.5 to 5% nitrogen by mass. This is close to the ideal oil values of 86% carbon and 14% hydrogen. Sulfur content was typically 0.5% or less which classifies this as a low sulfur or "sweet" crude substitute. By difference, the oxygen content ranged from 2-8%, most typically around 5%.

Trace metal content is important as high levels of certain metals are known to make refining the synoil into finished products more difficult, and thus can cause the synoil product to lose some value. Table 8 shows trace metal as well as sulfur contents in the synoil produced compared to crude oil alternatives. The synoil made by this embodiment is of low viscosity (13 cSt @ 38 C), is soluble in tetrahydrofuran, and has a specific gravity of 0.82-1.0. By boiling fractions and viscosity it can classified as a medium sweet crude oil.

TABLE 8

Trace Metal & Sulfur Concentrations in Intermediate Oils, Synoils & Crude Oils

| Sample | Hg (ppm) | Ni (ppm) | V (ppm) | Fe (ppm) | S (%) |
|---|---|---|---|---|---|
| Pyrolysis oil | <2 | 0.21 | <1 | — | 1.28 |
| Hydrogenated pyrolysis oil | <2 | 1.5 | <1 | 103 | 0.39 |
| Synoil 1 | <2 | 1.25 | <0.9 | 125 | 0.30 |
| Synoil 2 | 1.41 | 0.57 | 7.52 | — | — |
| Synoil 3 | 0.68 | 0.81 | 37.1 | — | — |
| Boscan crude oil[1] | — | 90 | 920 | — | — |
| Maya crude oil[1] | — | 39 | 242 | — | — |
| Cerro Negro crude[1] | — | 120 | 307 | — | — |

[1]Petroleum Chemistry and Refining by James G. Speight, J. G. Speight (1997)

Example 9

Catalytic Lignite Digestion

Low-ash lignite (25 g) was slurried with 50 mL hydrogenated pyrolysis oil with no conversion agent. The reaction was kept at 100° C. for 1 hour and 45 minutes with minimum H2 flow monitored through bubbler. The reactor was sealed and heated to 375° C. for 30 minutes, with maximum temperature 388° C. and maximum pressure 350 psi. This uncatalyzed reaction yielded 2-3 g of oil.

Another 25 g of low-ash lignite was slurried with 50 mL hydrogenated pyrolysis oil with the addition of 3 g of 25% Fe on alumina. The reactor was charged with 300 psi of $H_2$ and fast heated to 320° C., allowing it to react at 1000 psi for 3 hours. This catalyzed reaction yielded 8-9 g of oil, proving the importance of the reaction conditions.

Example 10

Refining Synoil

Synoil (80 g, 85% carbon and 10% hydrogen) made by one of the methods disclosed herein was separated by fractional distillation. Table 9 provides the mass of each fraction and its correspondence.

TABLE 9

Fractional Distillation of Synoil

| Boiling Range (C.) | Mass (g) and yield (%) | Notes |
|---|---|---|
| 25-190 | 1.5 g (1.9%) | Naphtha |
| 190-250 | 18.5 g (23%) | Kerosene (JP-8) |
| 250-350 | 25 g (31%) | Diesel |
| 350+ (bottoms) | 35 g (44%) | Lubrication oils and asphaltenes |

Simulated distillation was performed on synoil from Luminant coal. The yield of each type of fuel from a refinery can be estimated in Table 10.

TABLE 10

Estimated Refinery Yields
Maximum Jet Production

| | CTL SynOil Raw Yield | | CTL SynOil Hydrocracked Yield | |
|---|---|---|---|---|
| Product Cut | Max Jet (BPD), | Vol % | Max Jet (BPD) | Vol % |
| Gas | 0 | 0.0% | 34 | 3.1% |
| Gasoline | 7 | 0.7% | 174 | 16.0% |
| Jet | 209 | 20.9% | 526 | 48.3% |
| Diesel | 269 | 26.9% | 269 | 24.7% |
| Gas Oil | 429 | 42.9% | 0 | 0.0% |
| Resid/HFO | SB | 8.6% | 86 | 7.9% |
| Total | 1000 | 100.0% | 1089 | 100.0% |

What is claimed is:

1. A method for the preparation of synthetic oil (synoil), comprising:
    mixing a carbonaceous feedstock with a slurry oil to generate a slurry;
    contacting the slurry with an iron-containing conversion agent to generate a slurry-agent mixture, wherein the iron-containing conversion agent is prepared in a process comprising wetting $AL_2O_3$ particles with an aqueous solution of an iron salt to generate an iron-alumina composition;
    wherein the process further comprises calcining the iron-alumina composition at 300 to 600° C. in the presence of oxygen to produce a calcined iron-alumina composition;
    wherein the process further comprises reducing the calcined iron-alumina composition with H2 to produce the iron-containing conversion agent;

reacting the slurry-agent mixture at a hydrogen pressure of from 700 psi to 1,200 psi and a temperature of from 280° C. to 450° C. to generate a reaction-product mixture, whereby some or all of the carbonaceous feedstock is converted into synthetic oil (synoil); and separating solids from the reaction-product mixture to prepare a synoil.

2. The method of claim 1, wherein the slurry oil comprises light crude oil, pyrolysis oil, hydrogenated pyrolysis oil, intermediate crude oil, used motor oil, diesel, xylenes, tetralin, aliphatic hydrocarbons or aromatic hydrocarbons or mixtures thereof, pyrolysis oil derived from a carbonaceous feedstock, pyrolysis oil derived from lignite, comprises hydrogenated pyrolysis oil derived from lignite.

3. The method of claim 1, wherein the carbonaceous feedstock comprises lignite, lignite with an ash content of less than 26% on a dry basis, lignite with an ash content of less than 15%.

4. The method of claim 1, wherein the carbonaceous feedstock comprises sub-bituminous coal, low-ranked coal, heavy petroleum.

5. The method of claim 1, wherein the iron-containing conversion agent comprises a substance derived from bauxite.

6. The method of claim 1, wherein the iron salt comprises one or more of iron(III) nitrate, iron (III) chloride, iron (III) citrate, iron (II) chloride, iron (II) sulfate, iron (II) ammonium sulfate, and hydrates thereof.

7. The method of claim 1, wherein iron content of the iron-containing conversion agent is from 5% to 40% by weight, comprises a substance derived from red mud.

8. The method of claim 7, wherein the substance derived from red mud is prepared by a process comprising drying and crushing red mud, wherein the red mud comprises iron oxide, Al2O3, and a SiO2.

9. The method of claim 7, wherein the process further comprises calcining particles of the red mud at 300 to 600° C. in the presence of oxygen to produce calcined red mud particles.

10. The method of claim 9, wherein the process further comprises reducing the calcined red mud particles with H2 to produce the iron-containing conversion agent.

11. The method of claim 1, wherein the iron-containing conversion agent has an average particle size of 60 to 300 mesh.

12. The method of claim 1, wherein some or all of the iron-containing conversion agent was derived from the solids separated from the reaction-product mixture.

13. The method of claim 1, wherein hydrogenated pyrolysis oil is obtained from a process comprising:
heating the carbonaceous feedstock in the absence of oxygen to produce a pyrolyzed oil;
and hydrogenating some or all of the pyrolyzed oil with hydrogen in the presence of a conversion agent to produce the hydrogenated pyrolysis oil.

14. The method of claim 1, wherein the slurry oil comprises synoil.

15. The method of claim 1, wherein at least a portion of the slurry oil is recycled synoil.

16. The method of claim 1, wherein a ratio of carbonaceous feedstock to the slurry oil is about 1:1 to 1:3 by weight.

17. The method of claim 1, further comprising agitating the slurry-agent mixture.

18. The method of claim 1, further comprising removing water from the reaction-product mixture.

19. The method of claim 1, wherein the slurry oil comprises hydrogenated synoil.

20. A method for the preparation of a solvent, comprising:
pyrolyzing a carbonaceous feedstock whereby some or all of the carbonaceous feedstock is converted to a pyrolysis oil, and wherein the carbonaceous feedstock comprises lignite;
contacting the pyrolysis oil with an iron-containing conversion agent to form a pyrolysis oil-agent mixture; and reacting the pyrolysis oil-agent mixture at a hydrogen pressure from 300 psi to 1,000 psi and a temperature from 300° C. to 400° C. to generate a solvent.

21. The method of claim 1, wherein the slurry oil comprises fractionated components of synoil, a solvent derived from pyrolysis, a solvent derived from hydrogenated pyrolysis oil.

22. The method of claim 20, further comprising mixing the solvent with a pyrolysis oil, hydrogenated pyrolysis oil, a carbonaceous feedstock to generate a slurry.

23. The method of claim 22, further comprising reacting the slurry with an iron-containing conversion agent to prepare a synoil.

* * * * *